Patented Dec. 27, 1932

1,892,410

UNITED STATES PATENT OFFICE

OTTO RÖHM, HERBERT FISCHER, AND HEINRICH HESS, OF DARMSTADT, GERMANY

TANNING PROCESS

No Drawing. Application filed April 25, 1927, Serial No. 186,573, and in Germany April 30, 1926.

Our invention relates to tanning processes and has for its object to improve such processes.

We have found that tanning liquors comprising metallic salts and silicates are especially stable, if one uses at the same time acids having a valence greater than two, or their salts, either alone or together with mono- or bivalent organic acids. The acids having a valence greater than two, or their salts and the mono- or bivalent organic acids act to stabilize the colloidal condition of the tanning solutions, and in some cases, they also act themselves partly as tanning agents. The use of these stabilized tanning liquors results in an especially stout leather.

As especially advantageous in this respect have been found boric acid, acetic acid, phosphoric acid, lactic acid, oxalic acid, salicylic acid, phosphates, arsenates, antimonates, tin salts, and borates.

With the use of the salts or acids just referred to, one can easily produce, for example, a stable chrome liquor which is basic below four twelfth, which is impossible without the said additions. Moreover, the gelatinizing of the acid waterglass solution is prevented by the present invention.

Examples (1) 8 kg. chrome alum to which is added 0.8 kg. tin tetrachloride are dissolved in 40 liters of water. Moreover, 10 kg. commercial waterglass are neutralized with hydrochloric acid, until it will color slightly pink with phenol phthalein. This diluted neutral waterglass solution is added to the chrome alum tin tetrachloride solution and is increased to 150 liters by the addition of water. With this tanning liquor 100 kg. hides are tanned by being moved around for several hours in the fulling vessel. The leather is then treated or finished in the customary way.

(2) 20 kg. of an iron salt to which is added 0.8 kg. of phosphoric acid are dissolved in 25 liters of water and into this iron salt solution are poured while the solution is continuously stirred, 30 kg. of water glass, to which 170 liters of water have been added. With this liquor 100 kg. of hides are treated in the fulling vessel, until no more tanning agent is absorbed. Thereupon the leather is washed and dressed.

(3) 8 kg. of alum, to which are added 0.25 kg. of sodium phosphate and 0.1 kg. of oxalic acid, are dissolved in 40 liters of water. 3 kg. of commercial waterglass are diluted with water and are brought to about the hydrogen ion concentration of pH 8.4. This waterglass solution is poured into the alum solution, and this solution is increased by the addition of water to 200 liters. Thereupon the tanning is proceeded with.

As compared with other tanning processes, the present process is distinguished by the simultaneous use of metallic salts and silicates to which are added acids having a valence greater than two or their salts, be it alone or together with mono- or bivalent organic acids.

We claim:

For use in tanning processes, a colloidal tanning liquor, comprising a mixture of iron salts and silicates, to which mixture phosphoric acid has been added.

In testimony whereof we affix our signatures.

OTTO RÖHM.
HERBERT FISCHER.
HEINRICH HESS.